United States Patent [19]

Arroyo et al.

[11] Patent Number: 4,815,813

[45] Date of Patent: Mar. 28, 1989

[54] WATER RESISTANT COMMUNICATIONS CABLE

[75] Inventors: Candido J. Arroyo, Lithonia; Harold P. Debban, Jr., Lawrenceville; Walter J. Paucke, Tucker, all of Ga.

[73] Assignees: American Telephone and Telegraph Company, Murray Hill; AT&T Bell Laboratories & AT&T Technologies, Inc., Berkeley Heights, both of N.J.

[21] Appl. No.: 115,459

[22] Filed: Oct. 30, 1987

[51] Int. Cl.$^4$ .............................................. G02B 6/44
[52] U.S. Cl. .............................. 350/96.23; 174/23 C
[58] Field of Search ..................... 350/96.23, 96.1; 174/70 R, 70 S, 23 A, 23 C

[56] References Cited

U.S. PATENT DOCUMENTS

| | | | |
|---|---|---|---|
| 2,316,129 | 4/1943 | Bock | 536/50 |
| 3,425,971 | 2/1969 | Gugliemelli et al. | 525/54.32 |
| 3,509,269 | 4/1970 | Elliott | 174/120 R |
| 3,538,235 | 11/1970 | Arendt et al. | 174/23 C |
| 3,661,815 | 5/1972 | Smith | 525/54.32 |
| 3,803,339 | 4/1974 | Speekman | 174/23 C |
| 3,849,361 | 11/1974 | Zweigle | 524/376 |
| 4,002,819 | 1/1977 | Woytiuk | 174/23 C |
| 4,059,552 | 11/1977 | Zweigle et al. | 260/29.6 TA |
| 4,172,066 | 10/1979 | Zweigle et al. | 260/29.6 TA |
| 4,241,979 | 12/1980 | Gagen et al. | 350/96.23 |
| 4,260,443 | 4/1981 | Lindsay et al. | 156/220 |
| 4,282,121 | 8/1981 | Goodrich | 260/17.4 GC |
| 4,366,206 | 12/1982 | Tanaka | 428/373 |
| 4,366,294 | 12/1982 | Williams et al. | 525/327.6 |
| 4,401,366 | 8/1983 | Hope | 350/96.23 |
| 4,596,443 | 6/1986 | Diemeer et al. | 350/96.23 |
| 4,599,379 | 7/1986 | Flesher et al. | 524/801 |
| 4,622,263 | 11/1986 | Ando et al. | 428/288 |
| 4,649,164 | 3/1987 | Scott et al. | 521/149 |
| 4,701,015 | 10/1987 | Saito et al. | 350/96.23 |
| 4,701,016 | 10/1987 | Gartside, III et al. | 350/96.23 |
| 4,703,997 | 11/1987 | Ijiri et al. | 350/96.23 |
| 4,703,998 | 11/1987 | Uchioke et al. | 350/96.23 |
| 4,765,712 | 8/1988 | Bohannon, Jr. et al. | 350/96.23 |

OTHER PUBLICATIONS

An article entitled: "A Newly Developed Water-Blocking Fiber Optic Cable" by N. Nirasawa et al, Sumutomo Electric Technical Review-vol. No. 26, Jan. 1987.

An article entitled: "A Highly Effective Approach to Waterproofing Cable" by H. Hughes et al., International Wire & Cable Symposium Proceedings 1984, pp. 166–173.

B. J. Nieuwhof, "Longitudinal Waterblocking Performance of Conductive and Non Conductive Waterswellable Nonwovens", International Wire & Cable Symposium 1983, pp. 83–87.

B. J. Nieuwhof, "Conductive and Non Conductive Water Expandable Nonwoven Tapes for Longitudinal Water Blocking in Energy and Telcom Cables", pp. 1–5.

(List continued on next page.)

Primary Examiner—William L. Sikes
Assistant Examiner—Frank González
Attorney, Agent, or Firm—Edward W. Somers

[57] ABSTRACT

A communications cable comprising a core of at least one transmission media and a plastic jacket includes provisions for preventing the movement of water within the cable. A water blockable yarn (33) or strip (35) is interposed between the core and the jacket (32) and extends either linearly along the cable or is wrapped helically about a portion of the sheath system. In any plane along the cable which is transverse to the longitudinal axis of the cable, the yarn or the strip extends about an insubstantial portion of an inner periphery of the cable. As a result, any desired bond between the jacket and an underlying element of the cable sheath system is discontinuous for only an insignificant portion of the peripheral surface of contact. The yarn may be one which has been treated with a superabsorbent material whereas the strip may comprise a substrate strip which has been impregnated with a superabsorbent material which upon contact with water swells and inhibits the movement of water within the cable.

31 Claims, 6 Drawing Sheets

OTHER PUBLICATIONS

Firet Brochure, "Waterblocking, A Dutch Speciality".
DuPont Technical Information Brochure, "Reemay$^R$", Bulletin R-1, Mar. 1986, pp. 1-6.
Djock, J. C.; Klem, R. E., "Review of Synthetic and Starch-Graft Copolymer Superabsorbents", Insight '83, Absorbent Products Conference, Nov. 16-17, 1983, pp. 1-18.
Firet Brochure, "Problem Solutions for Industrial Applications Non-Woven Tapes for the Cable Industry", Mar./Apr. 1982, pp. 1-4.
Brochure, "'Lanseal-F' Super Absorbent Fiber", Chori America, Inc. on Behalf of Japan Exlan Co., Ltd., pp. 1-7.

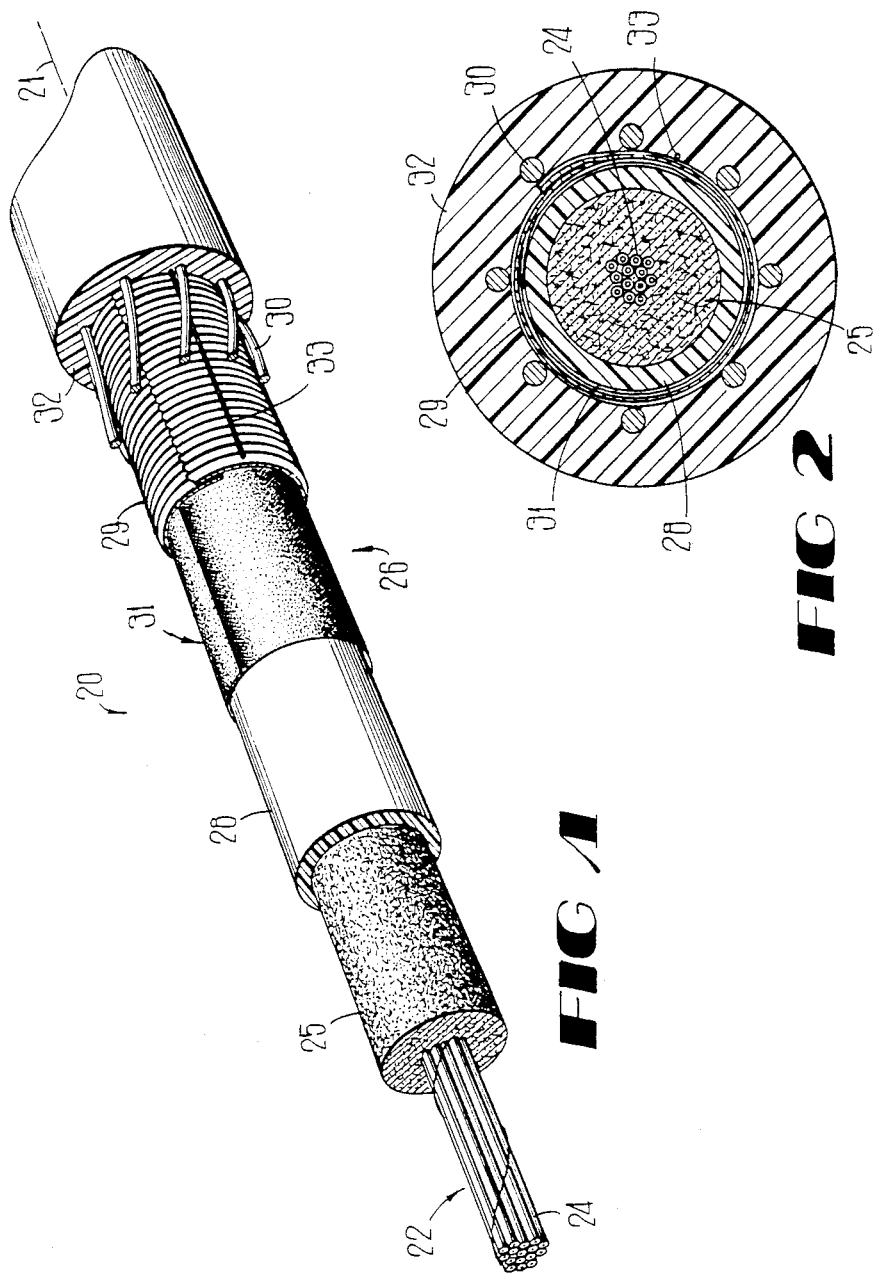

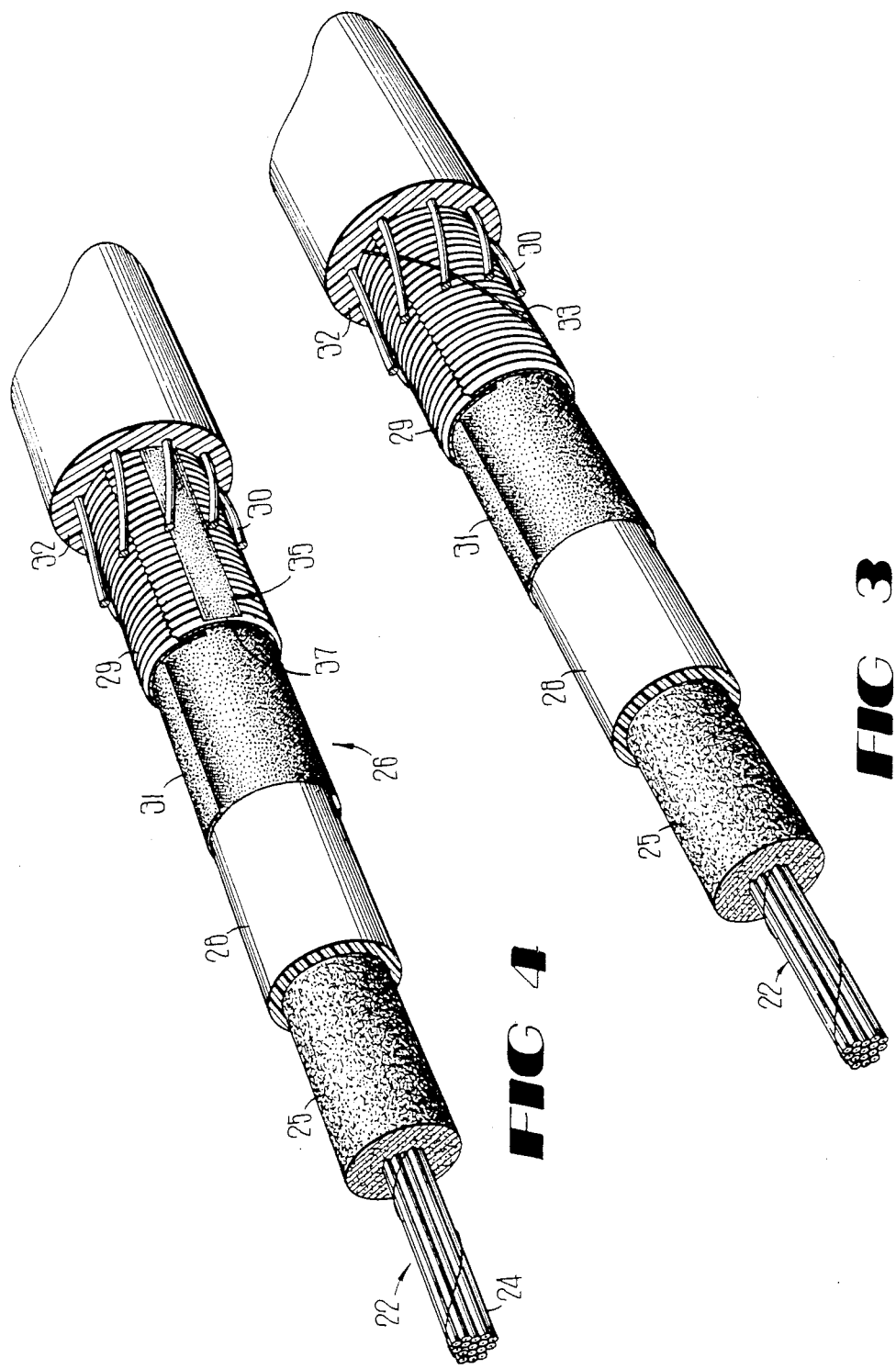

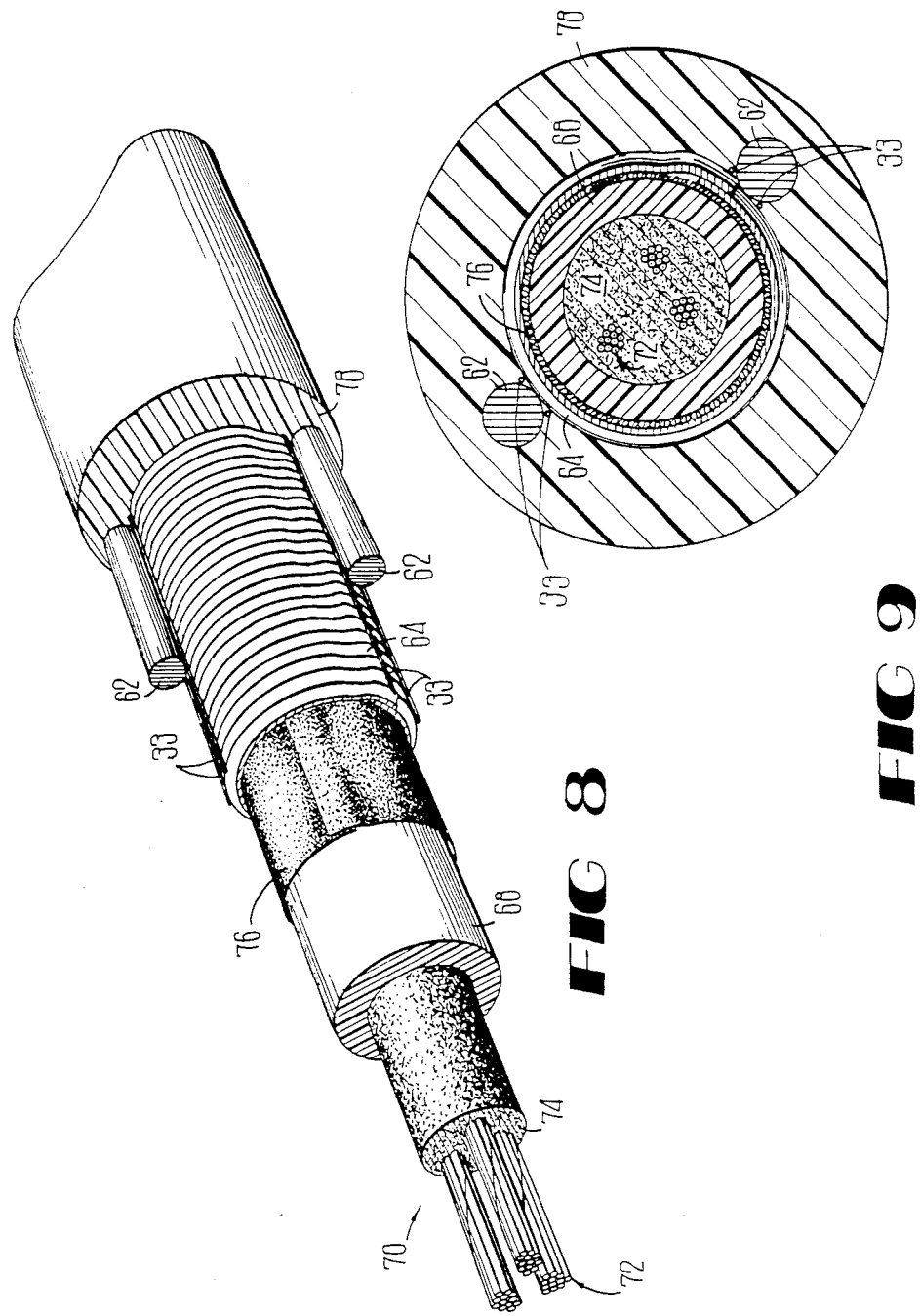

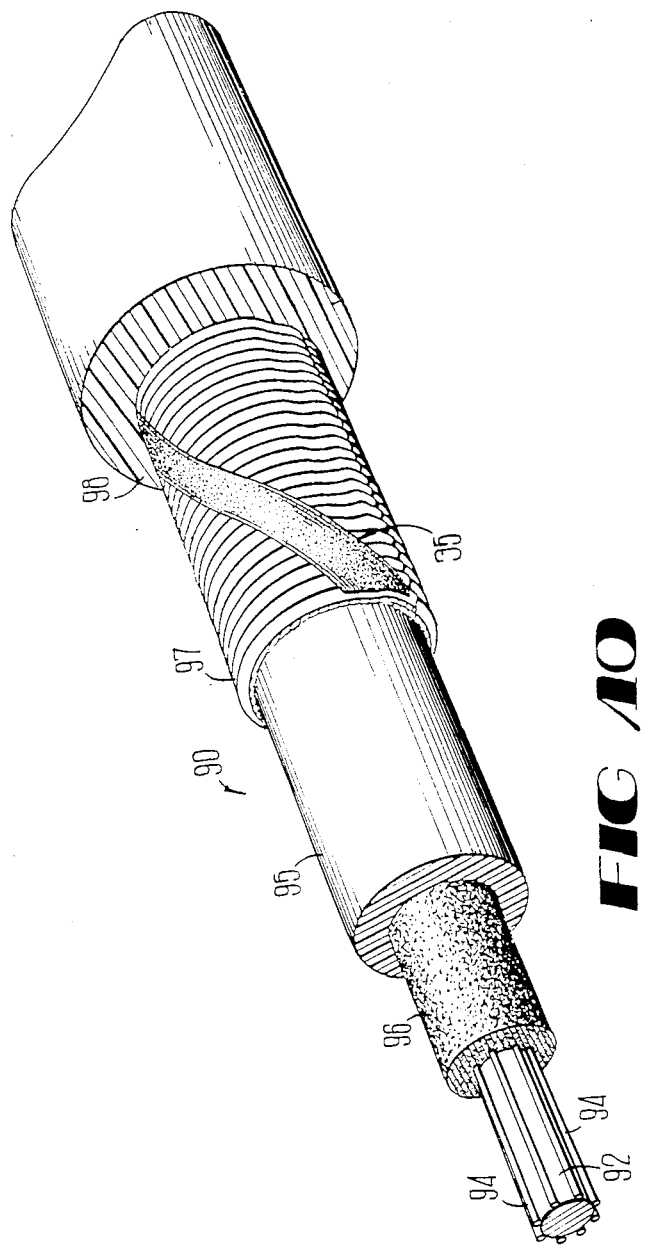

WATER RESISTANT COMMUNICATIONS CABLE

TECHNICAL FIELD

This invention relates to a water resistant communications cable. More particularly, it relates to a communications cable which includes facilities which are particularly useful in preventing the longitudinal migration of water along the interior of the cable.

BACKGROUND OF THE INVENTION

In the cable industry, it is well known that changes in ambient conditions lead to differences in vapor pressure between the inside and the outside of a plastic cable jacket. This generally operates to diffuse moisture in a unidirectional manner from the outside of the cable to the inside of the cable. Eventually, this will lead to an undesirably high moisture level inside the cable, especially if a plastic jacket is the only barrier to the ingress of the moisture. High moisture levels inside a cable sheath system may have a detrimental effect on the transmission characteristics of the cable.

Furthermore, water may enter the cable because of damage to the cable which compromises its integrity. For example, lightning or mechanical impacts may cause openings in the sheath system of the cable to occur, allowing water to move toward a core of the cable, and, if not controlled, to move longitudinally into splice closures. There are some splice closures available commercially in which the cable jacket is terminated inside the closure. Hence, if water is able to travel longitudinally along the cable, it could enter the splice closure, possibly causing a degradation in transmission.

Lately, optical fiber cables have made great inroads into the communications cable market. Although the presence of water itself within an optical fiber cable is not detrimental to its performance, passage of the water along the cable interior to connection points or terminals or associated equipment may cause problems and should be prevented. Also, in some climates, the development of ice within an optical fiber cable may have a crushing influence on the optical fibers in the core which may affect adversely the attenuation thereof.

In the prior art, various techniques have been used to prevent the ingress of water through the sheath system of a cable and into the core. For example, a metallic shield which often times is used to protect a cable against electromagnetic interference is provided with a sealed longitudinal seam. However, because lightning strikes may cause holes in the metallic shield, it is not uncommon to include additional provisions for preventing the ingress of water into the core.

Filling materials have been used to fill cable cores and to coat portions of cable sheath systems to prevent the movement longitudinally thereof of any water which enters the cable. Although the use of a filling material causes housekeeping problems, inhibits manufacturing line speeds because of the need to fill carefully interstices of the core and presents problems for field personnel during splicing operations, for example, it continues to be used to prevent entry of the water into the core. In other arrangements, an atactic material may be used to flood the outer surface of a metallic shield.

Presently, many commercially available cables also include a water-swellable tape. The tape is used to prevent the travel of water through the sheath system and into the core as well as its travel longitudinally along the cable to closures and termination points, for example. Such a tape generally is laminated, including a water swellable powder which is trapped between two cellulosic tissues. Further included may be a polyester scrim which is used to provide tensile strength for the laminated tape. Although such a tape provides suitable water protection for the cable, it is relatively expensive and thick. If the tape is too thick, the diameter of the cable is increased, thereby causing problems in terminating the cable with standard size hardware. The problem of tape thickness has been overcome by a water blockable member comprising a substrate tape which has been impregnated with a superabsorbent material. Such a water blockable member is disclosed and claimed in copending application Ser. No. 07/115,123 filed of even date herewith in the name of C. J. Arroyo.

Another factor that must be considered with respect to a water blocking system for a cable is the bonding of the plastic cable jacket to an underlying metallic shield. Where such adhesion is important to the performance of the cable, care must be taken not to interpose a water blocking member therebetween which would impair the desired adhesion.

In the past, it has been commonplace to dispose a water blocking tape between a shield of the sheath system and the core or core tube, if any. Although the use of a laminated water blocking tape or a water blockable tape such as that disclosed in previously identified C. J. Arroyo application Ser. No. 07/115,123 is placed typically between a metallic shield and a core tube, such an arrangement does not prevent the longitudinal flow of water between other elements of the sheath system and into closures, for example.

Seemingly, the prior art does not disclose a cable which is provided with a system which prevents substantially the flow of water longitudinally along the cable sheath system. What is needed and what does not appear to be available in the marketplace is a cable water blocking system which is relatively inexpensive and which does not compromise any desired bonding between members of the cable sheath system. Such a system should be one which is easily provided during the cable manufacturing process.

SUMMARY OF THE INVENTION

The foregoing problems of the prior art have been overcome with the cable of this invention. That cable includes a core which may include optical fibers or metallic conductors and a plastic jacket. Interposed between the core and the jacket is an elongated water blocking member. The water blocking member has a relaively high tensile strength and is relatively thin.

The water blocking member may be in the form of a strip or a yarn which covers only an insubstantial portion of an inner periphery of the cable. In this way, the strip or the yarn separates only an insubstantial portion of the jacket from other portions of the sheath system. Hence, if adhesion between the jacket and the other portions of the sheath system is desired, that adhesion is not compromised by the water blocking member. Further, the water blocking member extends linearly or helically along the cable. In a cable in which strength members extend linearly within the cable, the strip or yarn may be wrapped helically about a core tube along an outer surface of which extends the strength members. In a cable in which the strength members extend helically about the cable core, the yarn or strip extends linearly or is wrapped in a helical direction opposite to that of the strength members and is disposed between the strength members and the core.

BRIEF DESCRIPTION OF THE DRAWING

Other objects and features of the present invention will be more readily understood from the following detailed description of specific embodiments thereof when read in conjunction with the accompanying drawings, in which:

FIG. 1 is a perspective view of a communications cable having a sheath system which includes a water blockable member with various layers of the sheath system broken away and some of the layers exaggerated in thickness for purposes of clarity;

FIG. 2 is an end sectional view of the cable of FIG. 1 which illustrates some elements of the cable in greater detail;

FIG. 3 is a perspective view of the cable of FIG. 1 with a yarn therein being applied helically;

FIG. 4 is a perspective view of another embodiment of the cable of FIG. 1 which includes a water blockable strip;

FIGS. 8 and 9 are perspective and end views of another embodiment of the cable of FIGS. 6 and 7 which includes water blockable yarns; and FIG. 10 is a perspective view of still another embodiment of this invention.

DETAILED DESCRIPTION

Figure 5:
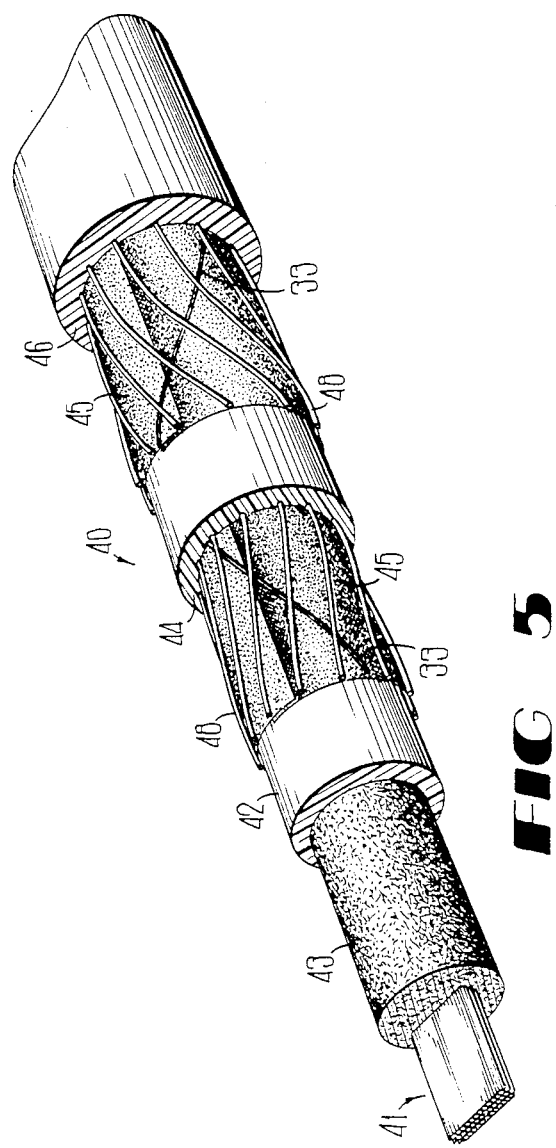
FIG. 5 is a perspective of a cross ply cable which includes water blockable yarn.

Referring now to FIGS. 1 and 2, there is shown a communications cable which is designated generally by the numeral 20. It has a longitudinal axis 21 and includes a core 22 comprising one or more optical fibers 24—24 and is filled with a material 25 such as that disclosed in U.S. Pat. No. 4,701,016 issued on Oct. 20, 1987, in the names of C. H. Gartside III, et al. The core is enclosed by a sheath system 26 which includes a core tube 28 which encloses the optical fibers, a corrugated metallic shield system 29 and one or more strength members 30—30 and an outer jacket 32. The shield system is bonded to the jacket 22. Such a cable is disclosed and claimed in commonly assigned U.S. Pat. No. 4,765,712 issued on Aug. 23, 1988. Disposed between the shield and the core tube is a water blockable tape 31 such as that disclosed and claimed in application Ser. No. 07/115,123 filed of even date herewith in the name of C. J. Arroyo. In the alternative, the water blockable tape is a laminate comprising two relatively porous substrate tapes having a water swellable powder therebetween.

In the cables of this invention, additional provisions are made for preventing the flow of water longitudinally along the cable into closures. Between the optical fibers 24—24 and the jacket 32 is disposed a water blocking member such as a yarn or strip which has been treated with a water blockable material such as a water swellable material. In the cable depicted in FIGS. 1 and 2, the strength members 30—30 extend helically about the metallic shield 29. The jacket 32 is bonded to the underlying shield with the strength members being embedded partially in the plastic of the jacket. In such a cable, when the strength members 30—30 engage the metallic shield 29, water may travel along the cable adjacent to the intersection of the strength members and the crests of the corrugated shield. Such flow is prevented substantially by causing a yarn or strip which covers only an insubstantial portion of the periphery of the shield to be disposed between the shield and the strength members.

In a preferred embodiment, the water blocking member is a yarn 33 (see FIG. 1) such as a 5 denier yarn, for example, which has been treated with a water swellable material. Such a yarn is disclosed in U.S. Pat. No. 4,366,206 which is incorporated by reference hereinto. Yarn suitable for use in a cable 20 is manufactured by Japan Exlan Co., Ltd. of Osaka, Japan. under the trade designation "LANSEAL-F" super absorbent fiber and is available commercially from Chori America, Inc. Obviously, a single yarn exgtending longitudinally of the cable in linear or helical fashion detracts very little from any bond between the jacket and any underlying shield.

The yarn 33 may extend substantially linearly along the cable parallel to its longitudinal axis so that each helically wound strength member crosses the yarn on each convolution. In the alternative, the yarn 33 may be wound helically in an oppositie direction from that of the helically wound strength members (see FIG. 3).

It is important that the water blockable member in any given plane transverse of the longitudinal axis 21 of the cable extend about only an insubstantial portion of an inner periphery of the cable in that plane. In this way, should it be desired to have an adhesive bond between the jacket and an underlying element of the sheath system such as a shield, for example, the yarn or tape disturbs only an insignificant portion of that bonding area.

For the cable depicted in FIG. 4, a water blockable, longitudinally extending strip 35 is positioned between the metallic shield 29 and the strength members 30—30. Because the strength members are wrapped helically about the shield, the water blockable strip extends linearly along the shield prior to the application of the strength members. In the alternative, it may be wrapped helically about the core in a helical direction opposite to that of the strength members as is the yarn in FIG. 3. Care must be taken in this instance also not to isolate completely the jacket from the shield because of the bonding therebetween which is desired. Indeed in some applications, the outer surface of the shield 29 is provided with an adhesive material to bond the jacket. The water protection of the cable must be accomplished witout compromising the bonding of portions of the sheath system. Typically, for a cable having an outer diameter of about 0.5 inch, a strip having a width of about 0.375 inch is disposed between the shield and the jacket. Hence, a substantial portion of the periphery of the shield is still available for bonding to the jacket.

The water blockable strip 35 may comprise a laminate in which a water swellable powder is disposed between two tapes or, as in a preferred embodiment, it may be a water blockable member such as that disclosed in the hereinbefore-identified C. J. Arroyo application field of even date herewith.

Should the strip 35 be made in accordance with the hereinbefore-identified C. J. Arroyo application filed of even date herewith, the tape comprises a substrate or carrier strip 37 made of a hydrophobic material and treated with a water blockable material. Advantageously, the treated tape is hydrophilic. A hydrophilic material is one that has a strong affinity for water in that it absorbs water easily.

In the preferred strip embodiment, the substrate strip 37 is a spunbonded non-woven polyester material and includes a web structure comprised of randomly-arranged fibers which are bonded primarily at the filament crossovers. Continuity of the fibers of the web, while not necessary to the invention, will provide the web with an increased tensile strength. The fibers may be formed of any plastic resin, or other appropriate material, which is substantially nonhygroscopic, and which has the capability of maintaining its shape in the presence of the temperatures encountered during the extrusion of the jacket 32. The fibers of the web structure are arranged so that air cells or pockets are formed.

A polyethylene terephthalate fiber product, formed into a web structure as described above has been identified under the registered trademark "Reemay" by the E. I. du Pont de Nemours and Company, Incorporated of Wilmington, Del. Presently, the Reemay® web structure is available in various thicknesses and densities from Reemay, Inc. of Old Hickory, Tenn. The properties of Reemay® tapes are further defined and described in Bulletin R-1, dated March, 1986, entitled "Properties and Processing of Reemay® Spunbounded Polyester" from E. I. du Pont de Nemours and Company, Incorporated, Wilmington, De.

Although in a preferred embodiment, a spunbonded polyester strip is used, others also are acceptable. For example, the substrate strip which is to be impregnated may be a nylon spunbonded fabric, non-woven glass, polypropylene melt blown non-woven fabric, polyurethane spunbonded fabric or TCF cellulose fabric, for example.

Another important characteristic of the strip 37 is the stiffness of the body of the material which comprises the strip. Within limits, as the material of the strip 37 is made increasingly stiffer, it is still relatively easy to form the tape longitudinally about the cable core 22 without wrinkling. However, it is important that the material be supple and flacid enough to conform readily to the contour of the outer surface of the core so that a minimal peripheral dimension is presented over which the dielectric jacket is applied. As a desirable consequence, a minimum overall diameter is achieved for the cable which will meet all the necessary requirements.

Stiffness of the material for the strip 37 is controlled by a combination of factors such as the number of fibers per unit volume, thickness of the material, size of the fibers and the amount and type of binder used in the material. Increasing the thickness of the material obviously increases the cost of the material per unit of surface area of cable covered. Increasing the number of the fibers per unit volume or increasing the amount of binder tends to decrease the ability of the material to prevent heat transfer. Thus, at least four factors, formability of the strip 35, cost of the strip, insulative capability of the strip, and its water blocking capability must be considered and balanced in providing the proper material for use on a particular cable.

In a preferred embodiment, the spunbonded polyester strip 37 combines the thermal, chemical and mechanical properties of polyester fibers with a spunbonded structure to provide a strip which is suitable for use in a communications cable. These properties include a relatively high tensile strength and elongation, excellent tear strength, and resistance to temperatures as high as about 400° F.

In order to render the substrate strip 37 swellable upon contact with moisture, the strip 37 is impregnated with a suitable water swellable material which herein is referred to a superabsorbent material. As will be recalled, the substrate strip 37 impregnated with a water swellable material is designated with the numeral 35.

Superabsorbents are hydrophilic materials which can absorb and retain water under pressure without dissolution in the fluid being absorbed. See J. C. Djock and R. E. Klern "Review of Synthetic and Starch-Graft Copolymer Superabsorbents" prepared for the Absorbent Products Conference held Nov. 16–17, 1983 in San Antonio, Tex. and incorporated by reference hereinto. Properties such as enzyme stability, biodegradability, absorbent capacity and rate of uptake are used to characterize a superabsorbent material. One of the early superabsorbents was a saponified starch graft polyacrylonitrile copolymer. See U.S. Pat. No. 3,425,971. The above-identified patent disclosed saponifying starch-graft polyacrylonitrile copolymers with aqueous bases.

The two major superabsorbents which are available today are cellulosic or starch-graft copolymers and synthetic superabsorbents. There are two major broad classes of synthetic superabsorbents. These are the polyelectrolytes and the nonelectrolytes. The polyelectrolytes are the most important and fall into four classes—polyacrylic acid superabsorbents, polymaleic anhydride-vinyl monomer superabsorbents, polyacrylonitrile-based superabsorbents and polyvinyl alcohol superabsorbents. Of these, the polyacrylic acid and polyacrylonitrile-based superabsorbents are the most common. As with cellulosic-graft copolymer superabsorbents, the capacity of synthetic superabsorbents decreases with increasing salinity.

The polyacrylic acid class of superabsorbents includes both homopolymers and copolymers of acrylic acids and acrylate esters. The monomer units usually are polymerized to produce a water-soluble polymer which is then rendered insoluble by ionic and/or covalent cross-linking. Cross-linking of the polymer may be accomplished with a multivalent cation, radiation, or with a cross-linking agent. The absorbency of the product is determined by the number of ionizable groups, usually carboxylates, and the cross-linking density.

The cross-linking density affects not only the absorbency, but also the time it takes to absorb and the strength of the gel formed. Generally, the higher the cross-linking density, the stronger is the gel which is formed. The time to reach absorbent capacity decreases as the cross-linking density increases, and the absorbent capacity decreases.

The spunbonded substrate strip 37 may be impregnated with any of several water blocking superabsorbent materials. In a preferred embodiment, it is impregnated with a superabsorbent material which is derived from an aqueous solution comprising acrylate polymeric material which combines acrylic acid and sodium acrylate functionalities and water. The impregnating material of the preferred embodiment comprises a sodium salt of polyacrylic acid in which all the carboxylic groups may or may not be reacted with sodium. In other words, it is saponified in whole or in part. The level of saponification which may fall within a relatively wide range depends on desired properties. After the substrate strip 37 has been impregnated, the superabsorbent material is dried to provide a film on the tape. It is desirable to impregnate the strip 35 with a film of the impregnating material instead of a powder. The impregnated tape 35 has a density of about 1.1 to 1.8 ounces per square yard which includes the density of the untreated tape 37 increased about 10 to 80%, i.e. add-on, by the treating material.

In another embodiment, a Reemay ® spunbonded polyester tape is impregnated with an aqueous solution comprising acrylates and acrylamide polymer powders mixed with water to provide a strip 35. The strip impregnated with such a composition has a density which may represent an increase as high as about 80% of the density of the untreated strip 37. In each of the embodiments just described, the impregnating material is a mixture of water and a superabsorbent material in which the mixture comprises about 4 to 7% solids when the impregnating material is an aqueous solution and applied.

In general, the strip 37 may be impregnated with (1) a material comprising polyacrylic acid, (2) a material comprising polyacrylamide (3) blends of (1) and (2) or salts thereof or (4) copolymers of acrylic acid and acrylamides and salts thereof as well as other similar superabsorbents.

Advantageously, in response to contact with water, the superabsorbent material in a cable structure swells to block the flow of water in a longitudinal direction. The superabsorbent material also forms a gel and changes the viscosity of the ingressed water at the point of contact with the superabsorbent material, making it more viscous and consequently developing more resistance to water flow. As a result, the flow of water longitudinally along a cable from a point of entry is reduced substantially.

The substrate strip 37 also possesses specific properties such as porosity and thickness which enhance its use as a water blocking element for a cable, particularly for a communications cable. Of importance is the need for the tape to be made of a material which has a relatively high porosity. It has been found that the water blockability of the strip 37 increases as the porosity of the tape increases. Porosity may be measured by air permeability in units of cubic feet per minute at a specified water pressure. At 0.5 inch of water pressure, typical porosities are in the range of about 120 to 1000 $CFM/ft^2$.

The water blocking capability of a Reemay ® spunbonded polyester impregnated strip is a surprising result. Inasmuch as the Reemay material has a relatively high porosity, it would be expected that moisture would penetrate it rather easily. In at least one catalog which discloses a superbonded polyester tape having a relatively high porosity, mention is made that the tape has a relatively low moisture pickup, presumably by surface tension. This seemingly would lead one away from its use as a water blockable tape for use in communications cables.

Porosity of the strip 37 enhances the water blockability of the treated strip 35. Evidently, because it is so porous, it is capable of accepting a substantial quantity of the impregnating material. As a result, entering water contacts a substantial area of the impregnating material which is water blocking. There is a surprisingly fast reaction between the water blocking material and the water causing the water blocking material to swell and block off further longitudinal movement of the water along the cable.

The porosity of the untreated strip 37 decreases with increasing thickness for a given denier. In a preferred embodiment, the Reemay ® tape is style 2014 which at 0.5 inch of water has a porosity of 800 $CFM/ft^2$. Reemay tape marketed under code designation 2014 has a density of 1.0 ounce per square yard, has a thickness of 0.008 inch and is formed of substantially straight polyethylene terephthalate fibers. Reemay tape having a code designation of 2024 has a density of 2.1 ounces per square yard, has a thickness of 0.012 inch, has a porosity of 350 $CFM/ft^2$ at 0.5 inch $H_2O$ and also is formed of substantially straight polyethylene terephthalate fibers. Reemay tape having a code designation of 2415 has a density of 1.15 ounces per square yard, has a thickness of 0.014 inch, has a porosity of 700 $CFM/ft^2$ at 0.5 inch $H_2O$ and is formed of crimped polyethylene terephthalate fibers.

Obviously, various other grades and thicknesses of Reemay ® spunbonded polyester tape or other similar materials may be used. Material densities of up to about 2 ounces per square yard are practical values. Practical material thickness may range from 0.005 inch to 0.012 inch thick. These values by no means limit the invention but represent the presently preferred ranges.

The porosity of the substrate strip 35 must be balanced against other properties. For example, because the strip is to be embodied in a cable, it is beneficial for the strip to have a relatively high tensile strength. For a given strip width, the tensile strength decreases as the thickness decreases. Although a larger thickness is desired insofar as tensile strength is concerned, a larger thickness may result in less porosity, at least for those strips which are available commercially. Therefore, these two properties must be balanced against each other to arrive at a final thickness. As mentioned hereinbefore, the style 2014 preferred Reemay ® tape has a thickness of 0.008 inch which is suitable for use in the cables of this invention.

Thickness of the strip 37 also is important from another standpoint. In order to allow the cable to be terminated by standard size hardware, the diameter of the cable must be maintained within a desired range. Accordingly, the thickness of each element of the sheath system must be considered. Therefore, the thickness is established while being mindful of the porosity and the tensile strength. The strip 37 must not be too thin, else the tensile strength is affected adversely, and if too thick, the porosity and overall cable outside diameter are affected adversely.

The water swellable strip or yarn may be used as a portion of a sheath system in cables other than that shown in FIGS. 1 and 2. For example, in U.S. Pat. No. 4,241,979, issued to P. F. Gagen and M. R. Santana, there is shown a cable 40 (see FIG. 5) having a core 41, a core tube 42 filled with a waterblocking material 43, an inner jacket 44 and an outer jacket 46 of plastic material. The cable also includes two layers of helically wound metallic strength members 48—48, the layers being wound in opposite directions. An inner layer of the strength members is disposed between the core tube 42 and the inner jacket 44 and the other between the inner jacket and the outer jacket 46. Underlying each layer of strength members is a bedding layer which comprises a Reemay ® tape 45. The tapes 45—45 each of which is wrapped about the cable to have a longitudinal overlapped seam, assist in preventing movement of the strength members circumferentially of the cable during handling and placement because of their compressibility. For water blocking, a water swellable yarn 33 or tape (not shown) is disposed between each layer of strength members and the underlying Reemay ® tape. The tape or yarn may be linearly extending or wrapped helically in an opposite direction from the strength members.

As mentioned earlier, the cable armor may be wrapped with a water blockable yarn instead of an impregnated tape. In a preferred embodiment, yarn such as that disclosed in U.S. Pat. No. 4,366,206, which is incorporated by reference hereinto is wrapped helically about the shield with a pitch of about 9 inches.

Figures 6, 7:
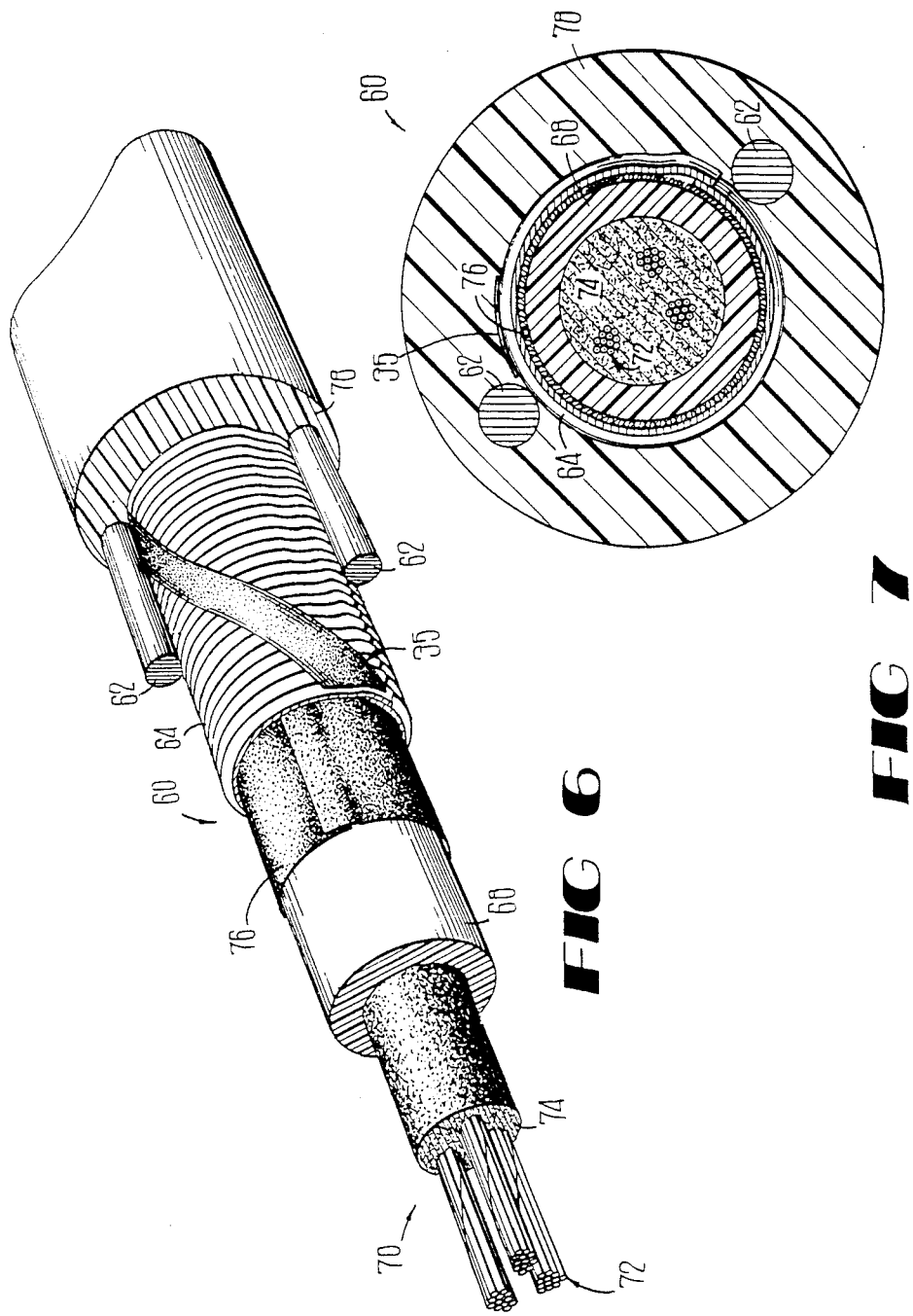
FIGS. 6 and 7 are perspective and end views of a cable which includes a water blockable strip.

Going now to FIGS. 6 and 7, there is shown a cable 60 having two substantially straight longitudinally extending strength members 62—62. The strength members are in engagement with an underlying metallic shield 64 and cross periodically an impregnated helically wrapped strip 35 such as a smaller width of the tape 31 in FIG. 1. The shield 64 encloses a core tube 68 and a core 70 comprising at least one transmission medium 72 such as an optical fiber. The core 70 may or may not be filled with a waterproofing material 74. The shield 64 is enclosed by a plastic jacket 78. For this arrangement, a water blockable tape 76, such as the tape 31, is wrapped about the core tube prior to the introduction of the shield. The peripheral coverage of the strip 35 is caused to be relatively small so that the interference with bonding between the shield and the overlying jacket 78 is relatively insignificant.

In an alternative embodiment of the cable of FIGS. 6 and 7, water swellable yarns 33—33 are caused to extend parallel to the strength members 62—62 (see FIGS. 8 and 9). As can be seen in the drawings, two longitudinally extending, substantially linear water swellable yarns 33—33 are associated with each strength member 62 and are parallel thereto. Each yarn 33 is nestled in nip between a portion of the circumference of the associated strength member and a portion of the periphery of the adjacent corrugated metallic shield 64.

In FIG. 10, there is shown a cable 90 which includes a centrally disposed strength member 92 and a plurality of optical fibers 94—94. The optical fibers 94—94 are enclosed in a core tube 95 which is filled with a water-blocking material 96. A metallic shield 97 overlies the core tube 95 and is enclosed by a plastic jacket 98. Between the metallic shield 97 and the plastic jacket 98 is disposed yarn 33 or a strip 35 which has been treated with an impregnating material. Desirably, the yarn 33 or strip 35 is wrapped helically about the shield 97.

It is to be understood that the above-described arrangements are simply illustrative of the invention. Other arrangements may be devised by those skilled in the art which will embody the principles of the invention and fall within the spirit and scope thereof.

What is claimed is:

1. A communications cable, which comprises:
   a core having a longitudinal axis and comprising at least one transmission medium;
   a core tube which comprises a plastic material and which encloses said core;
   a jacket which comprises a plastic material and which encloses said core tube; and
   a longitudinally extending water blockable member which is disposed between said core tube and said jacket and which covers a relatively small portion of an inner periphery of said cable.

2. The cable of claim 1, wherein said water blockable member extends linearly parallel to the longitudinal axis.

3. The cable of claim 1, wherein said water blockable member extends helically about the longitudinal axis.

4. The cable of claim 1, wherein said water blockable member is a yarn which has been treated with a water swellable material.

5. The cable of claim 1, wherein said water blockable member is a longitudinal strip of material which is water swellable upon contact with water.

6. A communications cable, which comprises:
   a core having a longitudinal axis and comprising at least one transmission medium;
   a jacket which comprises a plastic material and which encloses said core;
   a metallic shield which is disposed between said core and said jacket; and
   a longitudinally extending water blockable member which comprises a non-metallic material which is disposed in engagement with an outer surface of said shield between said shield and said jacket, said member being treated with a water blockable material which is swellable upon contact with moisture to block entry of moisture into said core and movement longitudinally along said cable and having a thickness that is controlled to optimize the tensile strength of the member and its porosity which prior to its being impregnated is relatively high, said water blockable member covering a relatively small portion of an outer surface of said shield.

7. The cable of claim 6, wherein said water blockable member extends linearly parallel to the longitudinal axis.

8. The cable of claim 6, wherein said water blockable member is a yarn that has been treated with a water blockable material.

9. The cable of claim 8, wherein said yarn is wrapped helically about an outer surface of said shield.

10. The cable of claim 6, wherein said water blockable member is a strip of material which has been treated with a water blockable material and wrapped helically about said shield.

11. The cable of claim 6, wherein said water blockable member includes a substrate strip which comprises a non-woven material.

12. The cable of claim 11, wherein said substrate strip comprises a spunbonded polyester material including continuous filament polyester fibers that are randomly arranged, highly dispersed and bonded at filament junctions and which has been impregnated with a water blocking material.

13. The cable of claim 12, wherein said strip is impregnated with a mixture comprising water and a water blockable material and the mixture comprises about 4 to 7% by weight of solids.

14. The cable of claim 12, wherein said water blocking material is a film which includes an acrylate polymer which includes acrylic acid and sodium acrylate.

15. The cable of claim 14, wherein the impregnated strip has a unit weight which is equal to about 1.1 to 1.8 ounces per square yard.

16. The cable of claim 15, wherein said substrate strip has a density and the density of the impregnated strip is about 10 to 80% greater than the density of the substrate strip.

17. The cable of claim 12, wherein said water blocking material is a film which includes acrylate acrylamide.

18. The cable of claim 12, wherein the relatively high porosity of said strip prior to the impregnation thereof is in the range of about 120 to 1000 CFM/ft$^2$ at 0.5 inch of water.

19. The cable of claim 12, wherein said substrate strip has a thickness which does not exceed about 0.010 and a tensile strength which is at least about 5 lbs/inch of width.

20. The cable of claim 19, wherein said strip prior to impregnation thereof has a porosity in the range of about 120 to 1000 CFM/ft$^2$ at 0.5 inch of water.

21. The cable of claim 12, wherein said water blocking material is selected from the group consisting of
   a. polyacrylic acid;
   b. polyacrylamide;
   c. blends of (a) and (b)
   d. salts of (a) and (b); and
   e. copolymers of (a) and (b).

22. The cable of claim 6, wherein said cable includes a plurality of strength members which are wound helically about said shield.

23. The cable of claim 22, wherein said water blockable member extends linearly generally parallel to the longitudinal axis.

24. The cable of claim 22, wherein said water blockable member is wrapped helically about said shield in a direction opposite to the direction of helical wind of said strength members.

25. The cable of claim 6, wherein said core is enclosed by a core tube comprising a plastic material with a first plurality of helically wound strength members overlying said core tube and an inner jacket of plastic material enclosing said first plurality of strength members with a second plurality of strength members overlying an outer surface of said inner jacket and an outer jacket which encloses said second plurality of helically wound strength members, said cable including one said longitudinally extending water blocking member which is disposed between and in engagement with each plurality of said strength members and the underlying plastic.

26. The cable of claim 25, wherein each said water blockable member extends generally linearly parallel to the longitudinal axis.

27. The cable of claim 25, wherein each said water blockable member is wrapped helically about said shield in a direction opposite to the direction of helical wind of the strength members in engagement therewith.

28. The cable of claim 6, wherein said cable also includes two diametrically opposed linearly extending strength members which are embedded at least partially in said jacket and wherein said longitudinally extending water blockable member is disposed between said metallic shield and said jacket.

29. The cable of claim 28, wherein water blockable member is wrapped helically about said shield.

30. The cable of claim 28, which includes two water blockable yarn members which are associated with each of said strength members and extend colinearly therewith, each of the two yarn members associated with a strength member being disposed generally in engagement with said shield and said strength member.

31. The cable of claim 6, wherein said cable includes a centrally disposed strength member, aa plurality of optical fibers disposed about said strength member, a shield and a plastic jacket and wherein said longitudinally extending water blockable member is disposed between said metallic shield and said jacket.

* * * * *